United States Patent [19]

Geck et al.

[11] Patent Number: 5,523,365
[45] Date of Patent: Jun. 4, 1996

[54] GRAFT COPOLYMERS OF ORGANOPOLYSILOXANES AS FREE RADICAL MACROINITIATORS

[75] Inventors: Michael Geck; Jochen Dauth; Bernward Deubzer, all of Burghausen; Helmut Oswaldbauer, Stubenberg; Manfred Schmidt, Eckersdorf; Frank Baumann, Eschenbach, all of Germany

[73] Assignee: Wacker-Chemie GmbH, Munich, Germany

[21] Appl. No.: 320,369

[22] Filed: Oct. 11, 1994

[30] Foreign Application Priority Data

Nov. 10, 1993 [DE] Germany .................. 43 38 421.8

[51] Int. Cl.$^6$ ........................................ C08F 2/00
[52] U.S. Cl. ............. 526/194; 526/219; 526/219.5; 526/223; 526/227; 528/30; 528/41; 528/43; 528/10; 528/35; 524/804; 524/806
[58] Field of Search ............... 526/194, 219, 526/219.5, 223, 227; 528/30, 41, 43, 10, 35; 524/804, 806

[56] References Cited

U.S. PATENT DOCUMENTS

| | | | |
|---|---|---|---|
| 3,719,650 | 3/1973 | Joy | 526/194 |
| 3,775,386 | 11/1973 | Citron | 526/194 |
| 4,595,740 | 6/1986 | Panster . | |
| 5,089,581 | 2/1992 | Clouet . | |
| 5,223,586 | 6/1993 | Mautner et al. . | |

FOREIGN PATENT DOCUMENTS

| | | |
|---|---|---|
| 98947 | 1/1984 | European Pat. Off. . |
| 0326728 | 8/1989 | European Pat. Off. . |
| 0413550 | 2/1991 | European Pat. Off. . |
| 0421894 | 4/1991 | European Pat. Off. . |
| 0582879 | 2/1994 | European Pat. Off. . |

OTHER PUBLICATIONS

European Polymer Journal 26 (1990) No. 5 "Synthesis of Silicone–Vinyl Block Copolymers" by Simionescu et al.
AN 94–050228, Derwent abstract.
Inoue et al., Journal of Polymer Science: Part A, vol. 26, 1077–1092 (1988).
S. Bantle et al., Macromolecules 1982, 15: 1604–1609 (1982).

*Primary Examiner*—Melvyn I. Marquis
*Attorney, Agent, or Firm*—Martin Connaughton

[57] ABSTRACT

The invention relates to crosslinked organopolysiloxanes which contain groups which form free radicals and are built up from units of the formula $$[R_a Si(O_{(3-a)/2})\text{-}R^1\text{-}X\text{-}(R^1\text{-}Si(O_{(3-a)/2}))_b R_a] \quad (1),$$

in which
X is a radical from the group consisting of —N=N—, —O—O—, —S—S— and —C(C$_6$H$_5$)$_2$—C(C$_6$H$_5$)$_2$—, and
R is monovalent SiC-bonded, optionally substituted C$_1$- to C$_{18}$-hydrocarbon radicals,
R$^1$ is divalent SiC-bonded, optionally substituted C$_1$- to C$_{18}$-hydrocarbon radicals which can be interrupted by divalent radicals, bonded to carbon atoms on both sides, from the group consisting of —O—, —COO—, —OOC—, —CONR$^2$—, —NR$^2$CO— and —CO—,
R$^2$ is a hydrogen atom or a radical R,
a has the values 0, 1 or 2 and
b has the values 0 or 1,
and further organosiloxane units. The organopolysiloxanes are used as free radical macroinitiators for grafting polymerization of ethylenically unsaturated monomers.

7 Claims, No Drawings

GRAFT COPOLYMERS OF ORGANOPOLYSILOXANES AS FREE RADICAL MACROINITIATORS

FIELD OF INVENTION

The present invention relates to crosslinked organopolysiloxanes which contain groups which form free radicals, their preparation, graft copolymers of the organopolysiloxanes as free radical macroinitiators and organic monomers which can be polymerized by free radicals, and a process for the preparation of the graft copolymers.

BACKGROUND OF INVENTION

A process for the preparation of silicone/vinyl block copolymers starting from linear polysiloxane(azobiscyanopentanamide) macroinitiators, which are obtained by reaction of α,ω-aminopropylpolydimethylsiloxanes with 4,4'-azobis(4-cyanopentanoyl chloride), and subsequent block polymerization with vinyl monomers, is described in the Journal of Polymer Science, Volume 26, 1077–92 (1988).

One possibility for the preparation of graft copolymers comprises grafting a polymer which carries a functional end group capable of reaction onto another polymer. This process, called the "grafting onto" process, is prior art for the preparation of graft copolymers from an organosilicon polymer (core) component and an organic polymer (shell) component, as described in U.S. Pat. No. 5,223,586. In this process, (mono)olefinically unsaturated monomers which can be polymerized by free radicals, such as vinyl monomers, are grafted onto an emulsified organopolysiloxane by the emulsion polymerization process in the presence of external free radical initiators.

Homopolymerization of the organic monomers is started by this "grafting onto" process by means of an external redox initiator system, and the growing organic polymer chains bond to the (silicone) grafting basis in this procedure. An obvious disadvantage of this process is that the bonding of the organic polymer to the polysiloxane does not necessarily occur, and a considerable portion of the organic polymer is thus not grafted onto the polysiloxane, but is present as non-bonded homopolymer; this can be demonstrated by extractions on insoluble graft copolymers consisting of an organosilicon and an organic polymer content, which have been prepared by the "grafting onto" process. A further disadvantage of the "grafting onto" process is that because of intramolecular linkages, in particular loopings by multiple bonding of the organic polymer chain on the organosilicon polymer core, graft copolymers built up in an uncontrolled manner are formed, which can be demonstrated by structural characterization of such graft copolymers, for example by means of static and dynamic light scattering.

Therefore, it is the object of this invention to provide organopolysiloxanes as free radical macroinitiators with which, graft copolymers can be prepared from crosslinked organopolysiloxanes and organic polymers. These graft copolymers do not have the above mentioned disadvantages of the known graft copolymers, that is a high content of organic polymer homopolymer and an uncontrolled build-up.

SUMMARY OF INVENTION

The present invention relates to crosslinked organopolysiloxanes which contain groups which form free radicals and are built up from 0.2% to 50.0% by weight of units of the formula $$[R_aSi(O_{(3-a)/2})\text{-}R^1\text{-}X\text{-}(R^1\text{-}Si(O_{(3-a)/2}))_bR_a] \quad (1),$$

0% to 80.0% by weight of units of the formula $$[R_3SiO_{1/2}] \quad (2),$$

0% to 99.5% by weight of units of the formula $$[R_2SiO_{2/2}] \quad (3),$$

0% to 99.8% by weight of units of the formula $$[RSiO_{3/2}] \quad (4)$$

and 0% to 80.0% by weight of units of the formula $$[SiO_{4/2}] \quad (5),$$

in which
R is monovalent SiC-bonded, optionally substituted $C_1$- to $C_{18}$-hydrocarbon radicals,
$R^1$ is divalent SiC-bonded, optionally substituted $C_1$- to $C_{18}$-hydrocarbon radicals which can be interrupted by divalent radicals, bonded to carbon atoms on both sides, from the group consisting of —O—, —COO—, —OOC—, —CONR$^2$—, —NR$^2$CO— and —CO—,
$R^2$ is a hydrogen atom or a radical R,
X is a radical from the group consisting of —N=N—, —O—O—, —S—S— and —C(C$_6$H$_5$)$_2$—C(C$_6$H$_5$)$_2$—,
a has the values 0, 1 or 2 and
b has the values 0 or 1,
with the proviso that the sum of units of formulae (4) and (5) is at least 0.5% by weight and that not more than 5% by weight of the organopolysiloxanes can be extracted with toluene.

The organopolysiloxanes are insoluble or only slightly soluble in all solvents, because of their crosslinked structure. Preferably, not more than 2% by weight of the organopolysiloxanes can be extracted with toluene.

Examples of unsubstituted radicals R are alkyl radicals, such as the methyl, ethyl, n-propyl, iso-propyl, n-butyl, iso-butyl, tert-butyl, n-pentyl, iso-pentyl, neo-pentyl and tert-pentyl radical, hexyl radicals, such as the n-hexyl radical, heptyl radicals, such as the n-heptyl radical, octyl radicals, such as the n-octyl radical and iso-octyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; alkenyl radicals, such as the vinyl, allyl, n-5-hexenyl, 4-vinylcyclohexyl and the 3-norbornenyl radical; cycloalkyl radicals, such as cyclopentyl, cyclohexyl, 4-ethylcyclohexyl and cycloheptyl radical, norbornyl radicals and methylcyclohexyl radicals; aryl radicals, such as the phenyl, biphenylyl, napthyl, anthryl and phenanthryl radical; alkaryl radicals, such as o-, m- and p-tolyl radical, xylyl radicals and ethylphenyl radicals; and aralkyl radicals, such as the benzyl radical and the α- and the β-phenylethyl radical.

Examples of substituted hydrocarbon radicals as the radical R are halogenated hydrocarbon radicals, such as the chloromethyl, 3-chloropropyl, 3-bromopropyl, 3,3,3-trifluoropropyl and 5,5,5,4,4,3,3-heptafluoropentyl radical and the chlorophenyl, dichlorophenyl and trifluorotolyl radical; mercaptoalkyl radicals, such as the 2-mercaptoethyl and 3-mercaptopropyl radical; cyanoalkyl radicals, such as the 2-cyanoethyl and 3-cyanopropyl radical; aminoalkyl radicals, such as the 3-aminopropyl, N-(2-aminoethyl)-3-aminopropyl and N-(2-aminoethyl)-3-amino-(2-methyl)propyl radical; aminoaryl radicals, such as the aminophenyl radical; acyloxyalkyl radicals, such as the 3-acryloxypropyl and 3-methacryloxypropyl radical; and hydroxyalkyl radicals, such as the hydroxypropyl radical.

The radical R is preferably an unsubstituted or substituted $C_1$- to $C_6$-alkyl radical or the phenyl radical, in particular the methyl, ethyl, propyl or phenyl radical, and in formula (1), the methyl, ethyl, propyl and phenyl radical.

Examples of divalent hydrocarbon radicals $R^1$ are saturated alkylene radicals, such as the methylene and ethylene radical, as well as propylene, butylene, pentylene, hexylene, cyclohexylene and octadecylene radicals, or unsaturated alkylene or arylene radicals, such as the hexenylene radical and phenylene radicals, and in particular radicals of the formula $$-(CH_2)_3N(R^3)-C(O)-(CH_2)_2-C(CN)(CH_3)- \quad (6),$$

in which
$R^3$ is a hydrogen atom or a methyl or cyclohexyl radical, and $$-(CH_2)_3-O-C(O)-(CH_2)_2-C(O)- \quad (7).$$

Preferred radicals X are —N=N— and —O—O—.
More preferably units of formula (1) fall under formula $$(CH_3)_aSi(O_{(3-a)/2})-(CH_2)_3-N(R^3)-C(O)-(CH_2)_2-C(CN)(CH_3)-N=]_2 \quad (8)$$

in which
a and $R^3$ have the above meanings.

The organopolysiloxanes preferably comprise
0.5% to 20.0% by weight of units of formula (1),
0% to 50.0% by weight of units of formula (2),
0% to 99.0% by weight of units of formula (3),
0% to 99.5% by weight of units of formula (4) and
0% to 50.0% by weight of units of formula (5),
with the proviso that the sum of the units of formulae (4) and (5) is at least 1% by weight.

In particular, the organopolysiloxanes comprise
0.5% to 10.0% by weight of units of formula (1),
0% by weight of units of formula (2),
0% to 98.5% by weight of units of formula (3),
1% to 99.5% by weight of units of formula (4) and
0% to 20.0% by weight of units of formula (5).

The organopolysiloxanes are preferably spherical microgels having particle diameters of preferably 5 to 200 nm in an aqueous medium. The molecular weights of the organopolysiloxane free-radical macroinitiators are preferably $10^5$ to $10^{10}$, in particular $5 \times 10^5$ to $10^9$ g/mole.

The invention further relates to a process for the preparation of the crosslinked organopolysiloxanes which contain groups which form free radical, by metering silanes of the formula $$R_aSi((OR^4)_{3-a})-R^1-X-(R^1-Si(OR^4)_{3-a}))_bR_a \quad (9),$$

and organosilicon compounds of the formula $$R_cSi(OR^4)_{4-c} \quad (10),$$

and optionally organosilicon compounds of units of the formula $$R_d(R^4O)_eSiO_{4-d-e/2} \quad (11),$$

in which
$R^4$ has the meanings of R,
c has the values 0, 1, 2 or 3,
d and e each have the values 0, 1, 2, 3 or 4 and
R, $R^4$, X, a and b have the above meanings, into an agitated mixture of emulsifier and water.

The above process is an emulsion polymerization/polycondensation process.

Organosilicon compounds of units of formula (11) which are preferably employed are the organosiloxanes of units of the formula $$R_2SiO_{2/2} \quad (12),$$

or organosiloxanes of the formula $$R_3SiOSiR_3 \quad (13).$$

The amounts of compounds of formulae (9), (10) and (11) employed are chosen such that the organopolysiloxanes according to the invention are obtained.

Preferably, the amounts employed are
0.2% to 50% by weight of compounds of formula (9),
0.0% to 99.8% by weight of compounds of formula (10),
0.0% to 99.0% by weight of compounds of formula (12) and
0.0% to 70.0% by weight of compounds of formula (13),
in each case independent and based on the total amount of organosilicon starting compounds. The radical $R^4$ is preferably an unsubstituted $C_1$- to $C_6$-alkyl radical or the phenyl radical, methyl, ethyl and propyl radicals being more preferred.

Preferred examples of the organosilicon compounds of formula (10) are tetraethoxysilane, methyltrimethoxysilane, phenyltriethoxysilane, dimethyldiethoxysilane, dimethyldimethoxysilane and trimethylethoxysilane.

Preferably, the organosilicon compounds of units of formula (12) contain 3 to 8, in particular 4 or 5 units. A preferred example is octamethylcyclotetrasiloxane.

A preferred example of the organosilicon compounds of formula (13) is hexamethyldisiloxane.

Particularly suitable emulsifiers are alkyl sulfates having a chain length of 8–18 carbon atoms, aryl and alkyl ethersulfates having 8–18 carbon atoms in the hydrophobic radical and 1–40 ethylene oxide (EO) or propylene oxide (PO) units;

sulfonates, for example alkyl-sulfonates having 8–18 carbon atoms, alkylarylsulfonates having 8–18 carbon atoms, esters and half-esters of sulfosuccinic acid with monohydric alcohols or alkylphenols having 4–15 carbon atoms, optionally these alcohols or alkylphenols can also be ethoxylated with 1–40 EO units;

alkali metal and ammonium salts of carboxylic acids having 8–20 carbon atoms in the alkyl, aryl, alkaryl or aralkyl radical;

phosphoric acid partial esters and alkali metal and ammonium salts thereof, for example alkyl and alkaryl phosphates having 8–20 carbon atoms in the organic radical, and alkyl ether- or alkaryl ether-phosphates having 8–20 carbon atoms in the alkyl or alkaryl radical and 1–40 EO units;

alkyl polyglycol ethers having 2–40 EO units and alkyl radicals of 4–20 carbon atoms;

alkylaryl polyglycol ethers having 2–40 EO units and 8–20 carbon atoms in the alkyl and aryl radicals;

ethylene oxide/propylene oxide (EO/PO) block copolymers having 8–40 EO or PO units;

fatty acid polyglycol esters having 6–24 carbon atoms and 2–40 EO units:

alkyl polyglycosides, naturally occurring substances and derivatives thereof, such as lecithin, lanolin, saponins and cellulose;

cellulose alkyl ethers and carboxyalkylcelluloses, the alkyl groups of which have up to 4 carbon atoms;

linear organo(poly)siloxanes which contain polar groups and have alkoxy groups having up to 24 carbon atoms and/or up to 40 EO and/or PO groups;

salts of primary, secondary and tertiary fatty amines having 8–24 carbon atoms with acetic acid, sulfuric acid, hydrochloric acid and phosphoric acids;

quaternary ammonium salts, such as halides, sulfates, phosphates, acetates or hydroxides;

alkylpyridinium, alkylimidazolinium and alkyloxazolinium salts, the alkyl chain of which has up to 18 carbon atoms, in the form of their halides, sulfates, phosphates or acetates.

Preferred emulsifiers are benzenesulfonic acids having aliphatic substituents and salts thereof, as well as quaternary ammonium halides and hydroxides.

The amount of emulsifier to be employed is 0.5%–20% by weight, preferably 1.0%–10% by weight, based on the total amount of organosilicon starting compounds employed. The organosilicon starting compounds of formulae (9) to (13) are added by metering. Preferably, all the starting components are mixed in the desired ratio. In order to obtain a homogeneous mixture, optionally 0.1%–30% by weight, based on the starting components, of alkanol of the formula $R^4OH$ is additionally added as a solubilizing agent. The alkanols more preferred being methanol, ethanol and propanol. The starting compounds, in particular the silanes of formula (10), can also be added not as a mixture but by metering successively, although this is not preferred.

As a result of the preparation, the organopolysiloxanes can also contain small amounts of hydrocarbonoxy radicals $OR^4$ and/or hydroxyl groups, but this is not preferred.

The emulsion polymerization/polycondensation is carried out at 5°–95° C., preferably at 10°–85° C., and more preferred at 10°– 40° C. The pH of the polymerization/polycondensation mixture is 1–12, preferably 7–11. For the stability of the emulsion during the preparation of the organopolysiloxanes, it is advantageous for the mixture to be subsequently stirred for an additional 0.5 to 15 hours after the end of the metering. The alkanol liberated during the hydroysis can be removed by distillation, optionally under reduced pressure. The solids content of the organopolysiloxane dispersion thus prepared should preferably be not more that 25% by weight, since otherwise a high increase in viscosity makes further processing of the dispersion (preparation of graft copolymers), difficult.

In a more preferred embodiment, 90% to 99.5% by weight of silane or mixture of silanes of formula (10), in which c has the values 0, 1 or 2, R is a methyl, ethyl, propyl or phenyl radical and $R^4$ is a methyl or ethyl radical, and 0.5% to 10% by weight, based on the total amount of organosilicon starting compounds, of silane of the formula

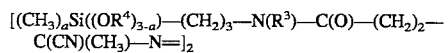
(14)

in which $R^4$ is a methyl or ethyl radical and a and $R^3$ have the above meanings, are mixed, optionally, with 0.1% to 30% by weight, based on the total amount of organosilicon starting compounds, of methanol, ethanol and/or propanol, and the mixture is preferably metered into an agitated mixture of 1%–10% by weight, based on the amount of organosilicon compounds employed, of methylalkylbenzylammonium salt in water, preferably at room temperature and preferably in 1–8 hours, and the mixture is stirred at room temperature for an additional 1–15 hours. The pH of the water/emulsifier mixture is 7–11 and is therefore established beforehand with a base, in particular an alkali metal hydroxide.

The silanes containing free radical initiator are incorporated quantitatively into the organopolysiloxane free radical macroinitiators by this process. This can be demonstrated by breaking the aqueous dispersions by addition of salt, isolating the free radical macroinitiators in bulk, washing them, drying them at room temperature in vacuo and analyzing them by means of differential scanning calorimetry (DSC). As is known to the expert, DSC allows measurement of amounts of heat which a sample absorbs from the environment or releases to it during an isothermal working procedure. During thermolysis, for example, of compounds containing azo groups, the total area under the exothermic decomposition peak, standardized to the weight of the sample measured, gives the decomposition enthalpy J/g and is therefore directly proportional to the content of azo groups in the compound. If the decomposition enthalpy of a silicon network containing azo groups is related to the decomposition enthalpy of the starting silane containing azo groups, the actual content of azo groups in the silicone network can be determined.

The organopolysiloxanes are preferably employed as free radical macroinitiators for grafting polymerization of ethylenically unsaturated organic monomers.

The invention furthermore relates to a process for the preparation of graft copolymers in which 95% to 5% by weight of organopolysiloxanes are reacted with 5% to 95% by weight of ethylenically unsaturated monomers in an aqueous dispersion.

In the process, the polymer to be grafted carries a reactive grouping which reacts with the monomer added for grafting. This process is called the "grafting from" process. At the start of the polymerization, the graft branches grow directly on the grafting basis, so that graft copolymers having a defined structure can be built up in a targeted and controllable manner. By covalent incorporation of initiators into the polymer to be grafted, which dissociate into free radicals and can then initiate grafting polymerization, homopolymerization of the grafting monomer is possible only to a very low degree and only by transfer reactions.

Preferably, a dispersion described above of the organopolysiloxane free radical macroinitiators is initially introduced into the reaction vessel. If it has not already happened during its preparation, the dispersion is freed, optionally, by distillation at preferably 20°–40° C. under reduced pressure from the alcohol formed during hydrolysis of the starting silanes, and optionally diluted with water. Optionally, a further 1%–15% by weight, based on the amount of free radical macroinitiator it contains, of emulsifier is added to the dispersion, which is preferred. Preferably, the same emulsifier which was also used for the preparation of the free radical macroinitiator dispersion is employed. The dispersion is preferably saturated with nitrogen for 10–90 minutes, and the pH of the dispersion should preferably be 7–9.

Ethylenically unsaturated organic monomers are then metered into the mixture in an amount which is 5%–95% by weight, preferably 20%–80% by weight, based on the total weight of graft copolymer. Monomers which are employed for the organic polymer content are, preferably, acrylic acid esters or methacrylic acid esters of aliphatic alcohols and diols having 1–10 carbon atoms, acrylonitrile, styrene, p-methylstyrene, α-methylstyrene, vinyl acetate, vinyl propionate, maleimide, vinyl chloride, ethylene, butadiene, isoprene and chloroprene. Styrene and acrylic acid esters and methacrylic acid esters of aliphatic alcohols having 1–4 carbon atoms, for example methyl (meth)acrylate, ethyl (meth)acrylate or butyl (meth)acrylate, are more preferred. Both homopolymers and copolymers of the monomers mentioned are suitable as the organic polymer content.

Grafting from the organopolysiloxane free radical macroinitiators is preferably started by increasing the temperature to 30°–90° C., preferably 60°–85° C. To bring the polymerization to completion, the starting temperature is maintained for 30 minutes to 8 hours, preferably 1–2 hours. Residual amounts of unreacted organic monomer can then be removed by distillation, which is preferred. The graft copolymers can be isolated from the dispersion by known processes, for example by coagulation of the latices by means of addition of salt or addition of polar solvents or spray drying.

The present invention further relates to graft copolymers obtained by the process.

The graft copolymers are spherical particles having particle diameters of preferably 10 to 250 nm in an aqueous medium. The molecular weights of the graft copolymers are preferably $10^6$ to $10^{10}$, in particular $5 \times 10^5$ to $10^9$ g/mole.

The graft copolymers prepared by the process have a defined build-up by controlled bonding of the organic polymer chains to the silicone grafting basis and a (silicone) core/(organopolymer) shell structure. Star- to brush-shaped graft copolymer structures develop, depending on the content of units of formula (1) and therefore on the density of grafting points on the organopolysiloxane. Graft copolymers which have a flexible silicone elastomer core of low crosslinking and are grafted with methyl methacrylate or styrene can be spray dried and processed as thermoplastic without problems. The graft copolymers prepared by the process show a significantly improved bonding of the organic polymer to the silicone grafting basis, and therefore a considerably lower content of the free organic homopolymer than corresponding graft copolymers which have been prepared in accordance with the prior art by the "grafting onto" method; this can be demonstrated by extraction experiments.

The graft copolymers are suitable for use as modified thermoplastics or for use as additives for polymer modification.

Static and dynamic light scattering are particularly suitable for structural characterization of the graft copolymers and of the organopolysiloxane free-radical macroinitiators. Static and dynamic light scattering are established methods in macromolecular chemistry and colloidal chemistry which are known to the expert for characterization of disperse particles. In static light scattering, the average is obtained of the scattering intensity at various angles over a sufficiently long interval of time, and information is obtained on the static properties of the macromolecules, such as the weight-average of the molecular weight $M_w$, the z-average of the square of the radius of gyration $<R_g^2>_z$, and the second virial coefficient $A_2$, which describes the intra- and intermolecular thermodynamic interactions of the dispersed particles with the solvent. In contrast to static light scattering, in the case of dynamic light scattering the fluctuation in the scattered light intensity is observed as a function of time. This leads to information on the dynamic properties of the molecules investigated. The z-average of the diffusion coefficient $D_z$ and therefore, by the Stokes-Einstein law, the hydrodynamic radius $R_h$ and the coefficient $k_d$, which describes the dependence of the diffusion coefficients on the concentration, are measured. From the dependence of the scattered light on the angle, the particle shape can be determined, and optionally structurings present in the solution can be clarified. Simultaneous static and dynamic light scattering measurement allows the above-mentioned information to be obtained by the system analyzed in a single experiment. This is described in S. Bantle, M. Schmidt and W. Burchard, Macromolecules 15, 1604 (1982).

The quotient of the radius of gyration and the hydrodynamic radius, the so-called ρ-ratio, provides information on the particle shape, such as hard spheres, hollow spheres or star-shaped polymer. By special techniques, such as index matching, the refractive index, for example, of a silicone core can be matched with the refractive index of the dispersing medium and the polymer shell of a silicone core/organic polymer shell graft copolymer by itself can be detected. By transfer of the graft copolymers from the aqueous medium to an organic dispersing agent, structural information, such as particle shape, can be obtained about these systems in surfactant-free form in the non-aqueous dispersing medium.

In the following examples, unless stated otherwise,
(a) all amounts are based on the weight;
(b) all pressures are 0.10 MPa (absolute);
(c) all temperatures are 20° C.

The following abbreviations have been used:
of th.=of theory.

EXAMPLES

Light scatterings:

The static and dynamic light scattering were measured with a unit which comprises, inter alia, a Stabilite$^R$ 2060-11s Kr laser from Spectra-Physics, an Sp-86 goniometer from ALV and an ALV-3000 Digital Structurator/Correlator. The krypton ion laser operated at a wavelength of 647.1 nm.

Sample preparation: The aqueous silicone free radical macroinitiator dispersions and other silicone network dispersions were diluted with $10^{-4}$ molar potassium bromide solutions and the aqueous graft copolymer dispersions were diluted with deionized water having a specific conductivity of 0.056 μS/cm, and the samples were filtered three times through Millex$^R$-GS filters (0.22 μm pore size) from Millipore. The graft copolymer dispersions in dimethylformamide were filtered three times through Millex$^R$-FGS filters (0.2 μm pore size) from Millipore. The measurement temperature in the light scattering experiments was 20° C. The dynamic light scattering measurements were carried out as a function of the angle in 20° steps from 50° to 130°, and in the static light scattering experiment, the dependence of the scattered light on the angle was measured in 10° steps from 30° to 140°.

Differential scanning calorimetry (DSC) measurements:

The substances were measured on a DSC 7 from Perkin Elmer. Indium was used as the calibration substance. In each case 2–3 mg of the starting silanes containing free radical initiator and 10–12 mg of the silicone free radical macroinitiators were weighed out. The heating rate was 10 K/minute.

(1) Preparation of starting silanes containing free radical initiator (Examples 1 and 2):

EXAMPLE 1

4,4'-Azobis-[4-cyanopentanoic acid (N-(methyl)-N-((3-triethoxysilyl)-propyl))amide], I 7.5 g (23.6 mmol) of 4,4'-azobis(4-cyanopentanoyl chloride) were dissolved in 20 ml of dichloromethane and the solution was filtered. The solution was added dropwise to a mixture of 11.06 g (47.2 mmol) of methylaminopropyltriethoxysilane and 5.26 g (52 mmol) of triethylamine in 500 ml of anhydrous diethyl ether at −10° C. and the reaction mixture was stirred at −10° C. for 1 hour. The white precipitate formed was filtered off and the clear filtrate was concentrated to constant weight at 25° C. under a high vacuum. 15.0 g (89% of th.) of pale yellow crystalline I were obtained.

EXAMPLE 2

4,4'-Azobis-[4-cyanopentanoic acid (N-(methyl)-N-((3-trimethoxy silyl)-propyl))amide], II The procedure of Example 1 was repeated, with the modification that instead of 11.06 g (47.2 mmol) of methylaminopropyltriethoxysilane, 9.08 g (47.2 mmol) of methylaminopropyltrimethoxysilane were employed. 13.4 g (90% of th.) of II were obtained.

(2) Preparation of organopolysiloxane free radical macroinitiators (Examples 3 to 7) and preparation of crosslinked silicone grafting bases according to the prior art (Comparison Examples 1 to 3):

EXAMPLE 3

500 g of water, 6 g of Dodigen$^R$ 226 (coconut alkyldimethylbenzylammonium chloride, 50% strength in water), from Hoechst AG; and 0.5 g of sodium hydroxide solution (10% strength in water) were initially introduced into the reaction vessel, and a mixture of 99.0 g (0.73 mole) of methyltrimethoxysilane and 1.0 g (1.4 mmol) of I from Example 1 was added at 20° C. in the course of 2 hours, while stirring. After the mixture had been stirred at 20° C. for an additional 8 hours, a stable, clear, slightly opalescent dispersion having a solids content of 8.6% was obtained. A hydrodynamic radius $R_h$ of the monodisperse, spherical particles of 9.5 nm and a molecular weight $M_w$ of $1.1 \times 10^6$ were determined by means of static and dynamic light scattering. Quantitative incorporation of I into the silicone network could be demonstrated by means of differential scanning calorimetry (DSC).

EXAMPLE 4

The procedure of Example 3 was repeated, with the modification that instead of a mixture of 99.0 g of methyltrimethoxysilane and 1.0 g of I, a mixture of 97.0 g (0.71 mole) of methyltrimethoxysilane and 3.0 g (4.2 mmol) of I from Example 1 were metered into the initial mixture. The resulting stable, clear, slightly opalescent dispersion had a solids content of 8.7%. A hydrodynamic radius $R_h$ of the monodisperse, spherical particles of 11.0 nm and a molecular weight $M_w$ of $1.5 \times 10^6$ were determined by means of static and dynamic light scattering. Quantitative incorporation of I into the silicone network could be demonstrated by means of DSC.

EXAMPLE 5

The procedure of Example 3 was repeated, with the modification that instead of a mixture of 99.0 g of methyltrimethoxysilane and 1.0 g of I, a mixture of 95.0 g (0.70 mole) of methyltrimethoxysilane and 5.0 g (7.0 mmol) of I from Example 1 was metered into the initial mixture. The resulting stable, clear, slightly opalescent dispersion had a solids content of 8.8%. A hydrodynamic radius $R_h$ of the monodisperse, spherical particles of 13.3 nm and a molecular weight $M_w$ of $2.7 \times 10^6$ were determined by means of static and dynamic light scattering. Quantitative incorporation of I into the silicone network could be demonstrated by means of DSC.

COMPARISON EXAMPLE 1

The procedure of Example 3 was repeated, with the modification that instead of a mixture of 99.0 g of methyltrimethoxysilane and 1.0 g of I, a mixture of 97.0 g (0.71 mole) of methyltrimethoxysilane and 3.0 g (12.1 mmol) of methacryloxypropyltrimethoxysilane was metered into the initial mixture. The resulting stable, clear, slightly opalescent dispersion had a solids content of 8.5%. A hydrodynamic radius $R_h$ of the monodisperse, spherical particles of 9.3 nm and a molecular weight $M_w$ of $1.0 \times 10^6$ were determined by means of static and dynamic light scattering. Quantitative incorporation of I into the silicone network could be demonstrated by means of DSC.

EXAMPLE 6

A mixture of 100.0 g (0.67 mole) of dimethyldiethoxysilane, 97.4 g (0.72 mole) of methyltrimethoxysilane, 2.6 g (4.1 mmol) of II from Example 2 and 20 g of methanol was added dropwise to an initial mixture of 2000 g of water, 12 g of Dodigen$^R$ 226 (50% strength in water) and 10 g of sodium hydroxide solution (10% strength in water) at 20° C. in the course of 6 hours, while stirring. After the mixture had been stirred at 20° C. for an additional 2 hours, a stable, opalescent dispersion having a solids content of 5.3% was obtained.

EXAMPLE 7

A mixture of 160.0 g (1.08 mole) of dimethyldiethoxysilane, 36.7 g (0.27 mole) of methyltrimethoxysilane, 2.6 g (4.1 mmol) of II from Example 2 and 20 g of methanol was added dropwise to an initial mixture of 2000 g of water, 12 g of Dodigen$^R$ 226 (50% strength in water) and 10 g of sodium hydroxide solution (10% strength in water) at 20° C. in the course of 6 hours, while stirring. After the mixture had been stirred at 20° C. for an additional 2 hours, a stable, finely divided, white dispersion having a solids content of 5.4% was obtained.

COMPARISON EXAMPLE 2

The procedure was as in Example 7, with the modification that instead of a mixture of 160.0 g of dimethyldiethoxysilane, 36.7 g of methyltrimethoxysilane, 2.6 g of II from Example 2 and 20 g of methanol, a mixture of 160.0 g (1.08 mole) of dimethyldiethoxysilane, 37.9 g (0.28 mole) of methyltrimethoxysilane and 2.02 g (8.1 mmol) of methacryloxypropyltrimethoxysilane was added dropwise. A stable, finely divided, white dispersion having a solids content of 5.2% was obtained.

COMPARISON EXAMPLE 3

The procedure was as in Example 7, with the modification that instead of a mixture of 160.0 g of dimethyldiethoxysilane, 36.7 g of methyltrimethoxysilane, 2.6 g of II from Example 2 and 20 g of methanol, a mixture of 160.0 g (1.08 mole) of dimethyldiethoxysilane, and 40.8 g (0.30 mole) of methyltrimethoxysilane was added dropwise. A stable, finely divided, white dispersion having a solids content of 5.1% was obtained.

(3) Preparation of the graft copolymers:

EXAMPLE 8

0.5 g of Dodigen$^R$ 226 (50% strength in water) and an additional 50 g of water were added to 50 g of the dispersion from Example 3 having a solids content of 8.6%, and the mixture was stirred for 8 hours and then saturated with nitrogen for 20 minutes. After addition of 4.5 g of methyl methacrylate and stirring for 10 minutes, the mixture was heated to 80° C. and the polymerization was brought to completion at 80° C. in the course of 1 hour. After addition of 100 g of water, 100 g of distillate were removed at 40° C. under a pressure of 50 mbar. An opalescent dispersion having a solids content of 8.0% and a content of polymethyl methacrylate in the graft copolymer of 50% was obtained. A hydrodynamic radius $R_h$ of the monodisperse, spherical particles of 16 nm and a molecular weight $M_w$ of $3.4 \times 10^6$ were determined by means of static and dynamic light scattering. From the light scattering data of Examples 3 and 8, it could be ascertained that the polymethyl methacrylate in the graft copolymer had a hollow sphere structure, and the graft polymer thus had a (silicone) core/(polymethyl methacrylate) shell structure. By conversion of the aqueous dispersion into a dimethylformamide sol and determination both of the hydrodynamic radius and of the radius of gyration of the graft copolymer in dimethylformamide by means of static and dynamic light scattering, it could be demonstrated that the graft copolymer obtained according to Example 8 had a star-shaped polymer structure with a crosslinked silicone core and polymethyl methacrylate graft branches proceeding linearly therefrom in the non-aqueous medium.

EXAMPLE 9

The procedure was as in Example 8, with the modification that instead of the dispersion from Example 3, the dispersion from Example 4 was employed. An opalescent dispersion having a solids content of 8.0% and a content of polymethyl methacrylate in the graft copolymer of 50% was obtained. A hydrodynamic radius $R_h$ of the monodisperse, spherical particles of 16 nm and a molecular weight $M_w$ of $4.0 \times 10^6$ were determined by means of static and dynamic light scattering. From the light scattering data of Examples 4 and 9, it could be ascertained that the polymethyl methacrylate in the graft copolymer had a hollow sphere structure, and the graft copolymer thus had a (silicone) core/(polymethyl methacrylate) shell structure. By conversion of the aqueous dispersion into a dimethylformamide sol and determination both of the hydrodynamic radius and of the radius of gyration of the graft copolymer in dimethylformamide by means of static and dynamic light scattering, it could be demonstrated that the graft copolymer obtained according to Example 9 had a star-shaped polymer structure with a crosslinked silicone core and polymethyl methacrylate graft branches proceeding linearly therefrom in the non-aqueous medium.

EXAMPLE 10

The procedure was as in Example 8, with the modification that instead of the dispersion from Example 3, the dispersion from Example 5 was employed. An opalescent dispersion having a solids content of 8.1% and a content of polymethyl methacrylate in the graft copolymer of 50% was obtained. A hydrodynamic radius $R_h$ of the monodisperse, spherical particles of 18 nm and a molecular weight $M_w$ of $5.1 \times 10^6$ were determined by means of static and dynamic light scattering. From the light scattering data from Examples 5 and 10, it could be ascertained that the polymethyl methacrylate in the graft copolymer had a hollow sphere structure, and the graft copolymer thus had a (silicone) core/(polymethyl methacrylate) shell structure. By conversion of the aqueous dispersion into a dimethylformamide sol and determination both of the hydrodynamic radius and of the radius of gyration of the graft copolymer in dimethylformamide by means of static and dynamic light scattering, it could be demonstrated that the graft copolymer obtained according to Example 10 had a star-shaped polymer structure with a crosslinked silicone core and polymethyl methacrylate graft branches proceeding linearly therefrom in the non-aqueous medium.

EXAMPLE 11

The procedure was as in Example 8, with the modification that instead of the dispersion from Example 3, the dispersion from Example 4 was employed, and instead of 4.5 g of methyl methacrylate, 4.5 g of styrene were added. An opalescent dispersion having a solids content of 8.2% and a content of polystyrene in the graft copolymer of 50% was obtained. A hydrodynamic radius $R_h$ of the monodisperse, spherical particles of 16 nm and a molecular weight $M_w$ of $3.2 \times 10^6$ were determined by means of static and dynamic light scattering. From the light scattering data of Examples 4 and 11, it could be ascertained that the polystyrene in the graft copolymer had a hollow sphere structure, and the graft copolymer thus had a (silicone) core/(polystyrene) shell structure. By conversion of the aqueous dispersion into a dimethylformamide sol and determination both of the hydrodynamic radius and of the radius of gyration of the graft copolymer in dimethylformamide by means of static and dynamic light scattering, it could be demonstrated that the graft copolymer obtained according to Example 11 had a star-shaped polymer structure with a crosslinked silicone core and polystyrene graft branches proceeding linearly therefrom in the non-aqueous medium.

COMPARISON EXAMPLE 4

0.5 g of Dodigen$^R$ 226 (50% strength in water) and an additional 50 g of water were added to 50 g of the dispersion from Comparison Example 1 having a solids content of 8.5%, and the mixture was stirred for 8 hours and then saturated with nitrogen for 20 minutes. After addition of 0.5 g of methyl methacrylate and 25 mg of cumene hydroperoxide (80% strength in cumene) and stirring for 10 minutes, 70 mg of sodium hydrogen sulfite (37% strength in water) and an additional 4.0 g of methyl methacrylate were added and the mixture was stirred for an additional hour. It was then heated up to 80° C. and the polymerization was completed at 80° C. in the course of 2 hours. After addition of 100 g of water, 100 g of distillate were removed at 40° C. under a pressure of 50 mbar. A translucent, whitish dispersion having a solids content of 8.1% and a content of polymethyl methacrylate in the graft copolymer of 50% was obtained. A hydrodynamic radius $R_h$ of the monodisperse, spherical particles of 20 nm and a molecular weight $M_w$ of $5.1 \times 10^6$ were determined by means of static and dynamic light scattering. From the light scattering data of Comparison Examples 1 and 4, it could be ascertained that the polymethyl methacrylate in the graft copolymer had a hollow sphere structure, and the graft copolymer thus had a (silicone) core/(organic polymer) shell structure. By conversion of the aqueous dispersion into a dimethylformamide sol and determination both of the hydrodynamic radius and of the radius of gyration of the graft copolymer in dimethylformamide by means of static and dynamic light scattering, it could be demonstrated that the graft copolymer obtained according to Comparison Example 4 had a "soft sphere" structure, i.e., a loop-like arrangement of the polymethyl methacrylate chains around the silicone core by multiple bonding and loose loopings of the graft branches, in the non-aqueous medium.

EXAMPLE 12

540 g of dispersion from Example 6 were initially introduced into the reaction vessel and 85 g of a water/alcohol mixture were distilled off at 30° C. under a waterpump vacuum. 455 g of the resulting dispersion having a solids content of 5.4% were brought to a solids content of 5.0% with 45 g of water, 1.5 g of Dodigen$^R$ 226 (50% strength in water) were added, and the mixture was stirred for 1 hour and then saturated with nitrogen for 30 minutes. After addition of 25 g of methyl methacrylate and stirring for 30 minutes, the mixture was heated to 80° C. and the polymerization was completed at 80° C. in the course of 2 hours. After addition of 200 g of water, 300 g of distillate were removed at 90° C. under a pressure of 400 mbar. A finely divided, white, stable dispersion having a solids content of 11.3% and a content of polymethyl methacrylate in the graft copolymer of 50% was obtained.

EXAMPLE 13

580 g of dispersion from Example 7 were initially introduced into the reaction vessel, and 90 g of a water/alcohol mixture were distilled off at 30° C. under a waterpump vacuum. 490 g of the resulting dispersion having a solids content of 5.1% were brought to a solids content of 5.0% with 10 g of water. The procedure was then as in Example 12, with the modification that instead of 25 g of methyl methacrylate, 12.5 g of styrene were added. A finely divided, white, stable dispersion having a solids content of 8.8% and a content of polystyrene in the graft copolymer of 33% was obtained. 9.60 g of spray-dried (laboratory spray dryer 190 from Büchi), pulverulent graft copolymer from Example 13 were extracted with toluene in a Soxhlet apparatus for 16 hours. The extractable polystyrene content was less than 16% by weight (0.50 g) of the organic polymer content contained in the graft copolymer employed (i.e., 3.20 g).

COMPARISON EXAMPLE 5

1110 g of dispersion from Comparison Example 2 were initially introduced into the reaction vessel, and 235 g of a water/alcohol mixture were distilled off at 30° C. under a waterpump vacuum. 875 g of the resulting dispersion having a solids content of 5.7% were brought to a solids content of 5.0% with 125 g of water, and 3.0 g of Dodigen$^R$ 226 (50% strength in water) were added. The procedure was then the same as in Example 12, with the modification that instead of 25 g of methyl methacrylate, 25 g of styrene, 1 g of potassium peroxodisulfate solution (5% strength in water) and 1 g of sodium hydrogen sulfite solution (10% strength in water) were added, and instead of 80° C., a polymerization temperature of 65° C. was chosen. A finely divided, white, stable dispersion having a solids content of 8.0% and a content of polystyrene in the graft copolymer of 33% was obtained. 18.60 g of spray-dried (laboratory spray dryer 190 from Büchi), pulverulent graft copolymer from Comparison Example 5 were extracted with toluene in a Soxhlet apparatus for 16 hours. The extractable polystyrene content was 30% by weight (1.85 g) of the organic polymer content contained in the graft copolymer employed (i.e., 6.20 g).

COMPARISON EXAMPLE b 6

1110 g of dispersion from Comparison Example 3 were initially introduced into the reaction vessel, and 210 g of a water/alcohol mixture were distilled off at 30° C. under a waterpump vacuum. 890 g of the resulting dispersion having a solids content of 5.6% were brought to a solids content of 5.0% with 110 g of water, and 3.0 g of Dodigen$^R$ 226 (50% strength in water) were added. The procedure was then the same as in Example 12, with the modification that instead of 25 g of methyl methacrylate, 25 g of styrene, 1 g of potassium peroxodisulfate solution (5% strength in water) and 1 g of sodium hydrogen sulfite solution (10% strength in water) were added, and instead of 80° C., a polymerization temperature of 65° C. was chosen. A finely divided, white, stable dispersion having a solids content of 8.1% and a content of polystyrene in the graft copolymer of 33% was obtained. 18.90 g of spray-dried (laboratory spray dryer 190 from Büchi), pulverulent graft copolymer from Comparison Example 6 were extracted with toluene in a Soxhlet apparatus for 16 hours. The extractable polystyrene content was more than 80% by weight (5.1 g) of the organic polymer content contained in the graft copolymer employed (i.e., 6.30 g).

What is claimed is:

1. A process for the preparation of an organopolysiloxane which contains groups which form free radicals in which a silane of the formula

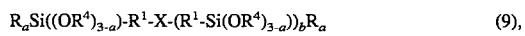

$$R_aSi((OR^4)_{3-a})-R^1-X-(R^1-Si(OR^4)_{3-a}))_bR_a \qquad (9),$$

and an organosilicon compound of the formula

$$R_cSi(OR^4)_{4-c}$$

and optionally an organosilicon compound of units of the formula

$$R_d(R^4O)_eSiO_{4-d-e/2} \qquad (11),$$

in which

R is a monovalent SiC-bonded, optionally, substituted $C_1$- to $C_{18}$-hydrocarbon radical, $R^4$ is a monovalent, optionally substituted $C_1$- to $C_{18}$-hydrocarbon radical, a has the values 0, 1 or 2, b has the values 0 or 1, c has the values 0, 1, 2 or 3, d and e each have the values 0, 1, 2, 3 or 4 and X is a radical selected from the group consisting of —N=N—, —O—O—, —S—S— and —C(C$_6$H$_5$)$_2$—C(C$_6$H$_5$)$_2$—, are metered into a mixture of emulsifier and water with stirring and allowed to react over time to form the organopolysiloxane.

2. A crosslinked organopolysiloxane which contains groups which form free radicals, comprising 0.2% to 50.0% by weight of units of the formula

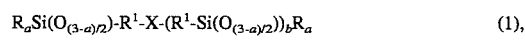

$$R_aSi(O_{(3-a)/2})-R^1-X-(R^1-Si(O_{(3-a)/2}))_bR_a \qquad (1),$$

0% to 80.0% by weight of units of the formula

$$R_3SiO_{1/2} \qquad (2),$$

0% to 99.5% by weight of units of the formula $$R_2SiO_{2/2} \quad (3),$$

0% to 99.8% by weight of units of the formula $$RSiO_{3/2} \quad (4)$$

and 0% to 80.0% by weight of units of the formula $$SiO_{4/2} \quad (5),$$

in which

R is a monovalent SiC-bonded, optionally substituted $C_1$- to $C_{18}$-hydrocarbon radical, $R^1$ is a divalent SiC-bonded, optionally substituted $C_1$- to $C_{18}$-hydrocarbon radical which can be interrupted by divalent radicals, bonded to carbon atoms on both sides, selected from the group consisting of —O—, —COO—, —OOC—, —CONR²—, —NR²CO— and —CO—, $R^2$ is a hydrogen atom or a radical R, X is a radical selected from the group consisting of —N=N—, —O—O—, —S—S— and —C($C_6H_5$)$_2$—C($C_6H_5$)$_2$—, a has the values 0, 1 or 2 and b has the values 0 or 1, with the proviso that the sum of units of formulae (4) and (5) is at least 0.5% by weight and that not more than 5% by weight of the organopolysiloxanes are extractable with toluene.

3. An organopolysiloxane as claimed in claim 2, which comprises 0.2% to 50.0% by weight of units of the formula $$((CH_3)_aSi(O_{(3-a)/2})(CH_2)_3-N(R^3)-C(O)-(CH_2)_2-C(CN)(CH_3)-N=)_2 \quad (8)$$

in which a has the values 0, 1 or 2, and $R^3$ is a hydrogen atom or a methyl or cyclohexyl radical or —(CH$_2$)$_3$—O—C(O)—CH$_2$)$_2$—C(O)—.

4. A process for the preparation of a graft copolymer, in which 95% to 5% by weight of an organopolysiloxane as claimed in claim 2 is reacted with 5% to 95% by weight of an ethylenically unsaturated monomer in an aqueous dispersion.

5. A process as claimed in clam 4, in which an aqueous dispersion of the organopolysiloxane is initially introduced into the reaction vessel and the monomer is metered in.

6. A process as claimed in claim 4, wherein the monomer is selected from the group consisting of styrene and acrylic acid esters and methacrylic acid esters of aliphatic alcohols having 1–4 carbon atoms.

7. A graft copolymer comprising the reaction product of;

from 95% to 5% by weight of the crosslinked organopolysiloxane of claim 2, and from 5% to 95% by weight of an ethylenically unsaturated monomer in an aqueous dispersion.

\* \* \* \* \*